July 2, 1957 J. F. BLASKI 2,797,607
SHEET METAL PENETRATING EXPANDIBLE RIVET
Filed Feb. 17, 1955
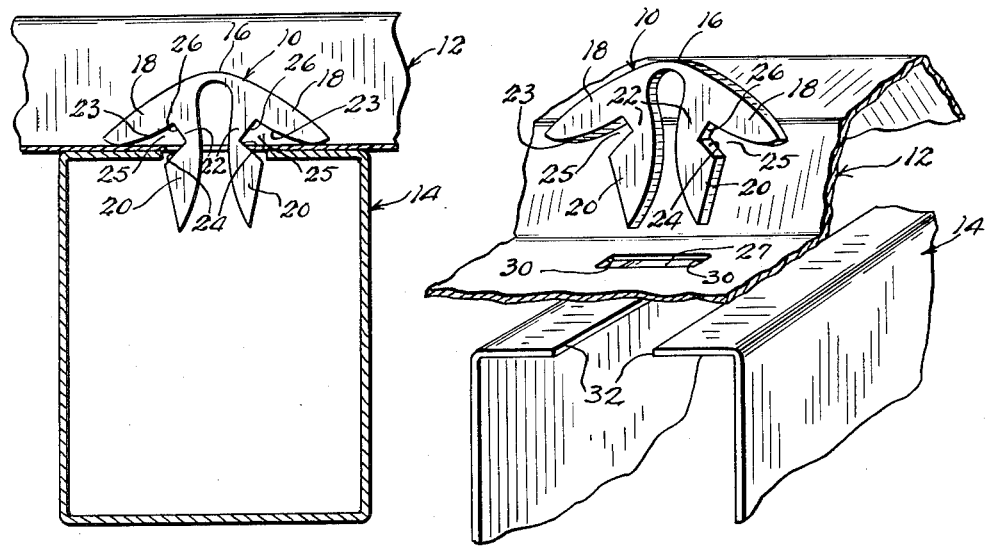
Fig. 1.
Fig. 2.
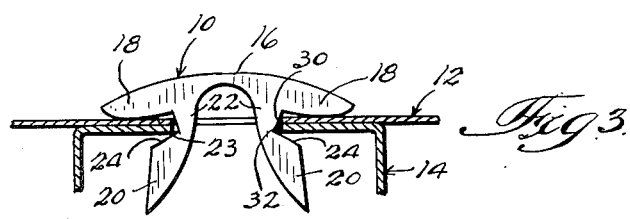
Fig. 3.
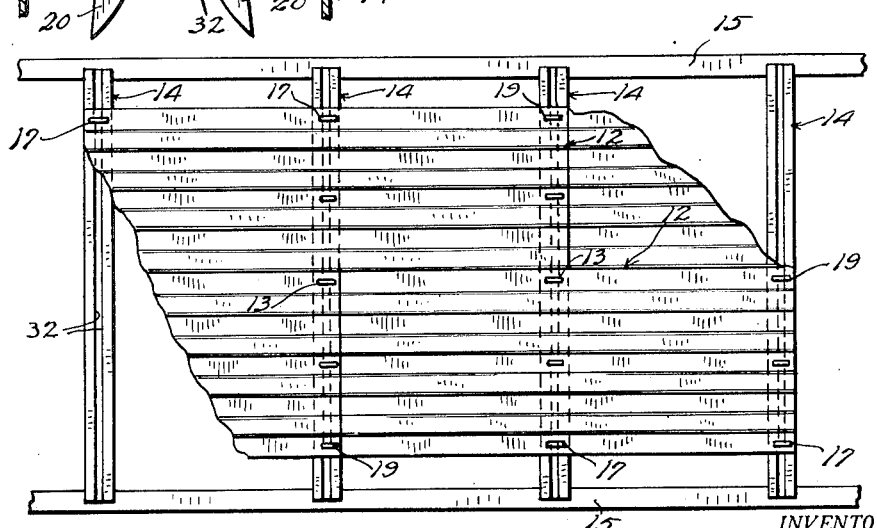
Fig. 4.
INVENTOR.
John F. Blaski
BY Thiess, Olsen, Mecklenburger, van Holst, & Coltman. Attys.

United States Patent Office 2,797,607
Patented July 2, 1957

2,797,607

SHEET METAL PENETRATING EXPANDIBLE RIVET

John F. Blaski, Chicago, Ill.

Application February 17, 1955, Serial No. 488,960

1 Claim. (Cl. 85—38)

The present invention relates to a fastener, and, more particularly, pertains to a fastener adapted to secure sheet metal or the like to an apertured or slotted supporting member.

It is an object of the present invention to provide a fastener which automatically locks two or more apertured or slotted components to be joined in tight, abutting relationship by means of novel slotted fastener portions which engage the opposed edges of the components to be joined, upon being fully driven in place.

It is another object of this invention to provide a fastener which is readily inserted without damaging any of the members which are joined.

It is another object of this invention to provide a fastener which is simple in design and which needs no special tool during the inserting operation.

It is also an object of the present invention to provide a fastener which may be readily and economically manufactured from ordinary metal stock by simple stamping operations.

It is a further object of this invention to provide a fastener member which is completely inserted and secured from an exterior side of the assembled parts.

It is a still further object of the invention to provide a readily deformable and easily insertable fastener which is possessed of great strength when in the inserted position.

Further and additional objects will appear from the description, accompanying drawings and appended claims.

The invention comprises a thin, deformable fastener member having a bridge composed of oppositely disposed wing portions, which are joined by a bight portion of relatively small cross section. The small cross-sectional area enables the bight portion to be readily deformed when slight forces, such as are imparted by hammer blows, are applied thereto. Depending from the proximal portion of each wing portion is a linking portion which joins a leg member to the superposed wing portion. Each of the leg members are of downwardly tapering configuration terminating at its lower end limit in a point, which facilitates entrance into a slot of a supporting member. The linking fastener portion defines an outwardly facing slot with the lower edge surface of the collar wing and an upper edge surface of the leg members. The opposed edge surfaces of these slots function as clamping means on edges of two or more members which are to be joined together.

For a more complete understanding of this invention reference should now be had to the drawings, wherein:

Figure 1 is a fragmentary sectional view showing the fastener member in elevation, prior to clamping a sheet metal member to a slotted supporting channel member;

Fig. 2 is a perspective view of the fastener member, which is the essence of the subject invention and the slotted, corrugated sheet metal panel which is to be joined to the underlying slotted, supporting channel member.

Fig. 3 is a fragmentary view showing the channel member and sheet metal resting thereon in clamped relationship, after the fastener member has been driven into position; and Fig. 4 is an elevational view showing corrugated sheet material positioned on slotted, supporting channel members.

The fastener 10 is depicted in the drawings in one of its more common and practical applications, namely, fastening corrugated sheet metal to supporting channel members 14. The corrugations are adapted to receive an appropriate aggregate which hardens and readily forms a portion of a building ceiling or floor. It is, of course, obvious that appropriate strips and panels having widely varying configurations and uses may be utilized with the subject fastener.

Referring now, more particularly, to Fig. 1, a fastener 10 is depicted preparatory to fastening a corrugated sheet metal panel or strip 12 to a slotted, supporting channel member 14. It will be noted that the fastener 10 comprises oppositely disposed wing portions 18, which in combination with a connecting bight portion 16 define a bridge which supports underlying depending legs 20. Interposed between the legs 20 and the proximal end portions of the wings 18 are fastener connecting portions 22.

A lower edge surface 23 of each wing portion 18 and an upper edge surface 24 of each leg 20 in combination with an edge 26 of the interconnecting fastener portion 22 define slotted recesses 25. It is these slotted recesses oppositely disposed on the fastener member 10 which engage aligned edge surfaces of two or more members to be joined in tight abutting relationship. It is thus apparent that the fastener 10 is adapted to secure opposed edges of slotted or apertured members by means of the fastener slots 25. Fig. 2 clearly discloses one of the preformed slots 27 in the corrugated sheet metal panel 12 and the slot defined by slot edges 32 in the channel 14. The corrugated panels 12 may be readily slotted in advance in the course of the manufacturing operations, although the fastener may be driven through panels of light gauge at the job site without previous perforation. Similarly, the slotted channels 14 may be replaced by closed box beams or other suitable supporting members which may be apertured at desired intervals of panel attachment. The above-mentioned substitute structural components will obviously work to equal advantage with the fastener 10. It is equally obvious that the combined thickness of the slot-defining edges of the members which are to be joined cannot exceed the thickness of the fastener slots 25.

Referring now to Fig. 3, the fastener 10 is shown in clamping engagement with edges 30 of the sheet metal strip 12 and slot-defining edges 32 of the channel member 14. To position the fastener member 10 in the clamping position shown in Fig. 3, the only force required is one or more light hammer blows applied to the bight portion 16. As has already been pointed out, the thin cross section of the fastener portion 16 enables the wing portions 18 of the fastener to readily assume substantially horizontal positions, as shown in Fig. 3. In the course of straightening the bight portion 16, the depending legs 20 are spread and moved outwardly as the oppositely disposed slots of the fastener engage the aligned edges 30 and 32. Consequently, when the wing portions 18 of the fastener are on a substantially horizontal plane the slot-defining edges of the members to be joined are fixedly clamped between the lower edge 23 of the wing portions 18 and the upper edge 24 of the legs 20.

Fig. 4 illustrates a floor assembly comprising a number of corrugated sheet metal panels 12 affixed to the supporting channel members 14 which are, in turn, supported by the beams 15. It will be noted that where the metal corrugated panels 12 overlap, as at joints 13, the opposed edges 23 and 24 of the fastener slots 25 must secure three thicknesses of the edges 30 of corrugated panels 12 in addition to the thickness of the slot-defining edge 32 of the slotted channel 14, whereas at points of fastener attachment 19 two thicknesses, and at points 17 only one thickness of corrugated metal 12 need by secured. However, it is apparent from Figs. 1, 2, and 3 that the thickness of the panels 12 is of such small magnitude that the number of panel thicknesses may vary from one to three and still be securely fastened to the supporting beams 14 by means of the fastener slots 25. As the number of panel thicknesses increase, different line contacts are made on the sloping edge surfaces 24 of the legs 20 by the slot-defining edges 32 of the channel 14.

The nature of the clamping action between the opposite slot or aperture-defining edges of the two members to be joined and the fastener member is directly dependent upon the thickness of the aligned edges positioned in the opposed slots 25 of the fastener 10. By employing fasteners having a slot thickness slightly less than the combined slot-defining edges to be joined, slight deformation of the edges will take place in the process of driving the fastener into place. Under these circumstances, a tight clamping engagement is insured between the opposed jaws or edges defined by the under edge surfaces of the wings 18 and the leg edge surface 24. Conversely, if the slotted recesses of the fastener 10 are approximately equal in span to the thickness of the aligned slot-defining edges of the two members to be joined, a looser clamping engagement of the two edges will result. It is, therefore, seen that the employer of the subject invention may readily control the nature of the clamping action exerted by the fastener on the sheet metal and supporting channel member by utilizing fasteners having slotted recesses of desired span.

Referring to Fig. 3, it will be noted that any force tending to pry the strip 12 from the channel member 14 will be resisted by the heavy fastener connecting portion 32. Also, a shearing or lateral movement of the sheet 12 relative to the channel 14 will be resisted by the horizontally aligned wings 18 and bight 16 which has no tendency to bend or buckle. It is, therefore, apparent that any force tending to disassemble the panels 12 from the channel 14 is adequately resisted. However, to remove an engaged fastener member 10, a force applied normal to the undersurface of the bight 16 will readily buckle the bight portion and facilitate fastener removal.

It will be obvious that certain modifications of the specific embodiment shown may be made without departing from the spirit and scope of this invention. For instance, the specific configuration of the wing portions 18 and the leg portions 20 may be varied. The essential features of the fastener are the bight portion 16 and the slotted portion of the fastener as defined by the leg, wing, and connecting portion edges. It is also obvious that a plurality of sheets in excess of two may be joined by the fastener, the limiting factor being the combined thickness of the slot defining edges of the superposed members.

It will thus be seen that a fastener has been provided which is of simple construction and design, and which may be economically manufactured. The fastener provided by this invention also has the advantage of adaptability for use without employing special tools or auxiliary devices in either accessible or blind positions. However, in those assembly operations in which the panels are perforated in the process of assembly a special tool may be employed. The tool will be adapted to drive the legs 20 normal to the thin sheet metal until sufficient penetration of the legs has been effected without bending of the bight portion 16. This preliminary fastener inserting step will be followed by a second application of force by the tool which will spread the bight portion so as to effect interlocking of the fastener and panel members to the supporting member.

While a particular embodiment of this invention is shown above, it will be understood, of course, that the invention is not to be limited thereto, since many modifications may be made, and it is contemplated, therefore, by the appended claim, to cover any such modifications as fall within the true spirit and scope of this invention.

I claim:

A fastener for joining at least one sheet member to an associated member, said fastener comprising two leg members extending in generally parallel spaced relationship, a bight portion connecting adjacent ends of said leg members and maintaining said leg members in substantially coplanar coextensive relationship, and two wing portions, one wing portion extending outwardly from said bight portion adjacent and at an angle relative to each of said leg members, said leg members, bight portion, and wing portions being substantially coplanar and formed from a single substantially flat, rigid sheet of material, said leg members extending from said bight portion with the outer edges of said leg members formed at an acute angle whereby said leg members gradually taper to piercing points at the free ends thereof, said bight portion having a cross section sufficient to sustain said leg members in generally parallel relationship when said piercing points are driven through said sheet and being yieldable upon engagement of said wing portions with said sheet, each of said wing portions and the corresponding leg member being formed to define a notch proportioned to receive said sheet member and said associated member in locked engagement, each of said notches having an axis forming an angle relative to the associated leg member.

References Cited in the file of this patent
UNITED STATES PATENTS

| | | |
|---|---|---|
| 964,226 | Farrand | July 12, 1910 |
| 1,925,488 | Kern | Sept. 5, 1933 |
| 2,090,167 | Wiley | Aug. 17, 1937 |
| 2,173,198 | Churchill | Sept. 19, 1939 |
| 2,198,186 | Tinnerman | Apr. 23, 1940 |
| 2,521,378 | Kolessar | Sept. 5, 1950 |
| 2,597,344 | Lang | May 20, 1952 |